United States Patent [19]

Farr

[11] 4,419,862
[45] Dec. 13, 1983

[54] HYDRAULIC MASTER CYLINDERS

[75] Inventor: Glyn P. R. Farr, Warwick, England

[73] Assignee: Lucas Industries Limited, Birmingham, England

[21] Appl. No.: 238,755

[22] Filed: Feb. 27, 1981

[30] Foreign Application Priority Data

Mar. 17, 1980 [GB] United Kingdom ............... 8008948

[51] Int. Cl.³ .......................................... B60T 11/20
[52] U.S. Cl. ...................................... 60/562; 60/576; 60/579; 60/589
[58] Field of Search ............... 60/574, 575, 576, 578, 60/579, 562, 589, 561, 581

[56] References Cited

U.S. PATENT DOCUMENTS

| 2,015,511 | 9/1935 | Bowen | 60/576 |
| 2,637,977 | 5/1953 | Seppmann | 60/578 |
| 3,032,996 | 5/1962 | Foreman | 60/574 |
| 3,237,411 | 3/1966 | Taft | 60/576 |

FOREIGN PATENT DOCUMENTS

| 1034981 | 4/1951 | France | 60/574 |
| 480045 | 7/1951 | Italy | 60/576 |

Primary Examiner—Abraham Hershkovitz
Attorney, Agent, or Firm—Scrivener, Clarke, Scrivener and Johnson

[57] ABSTRACT

A master cylinder for a hydraulic brake system includes a piston which divides a primary bore into a primary chamber and a secondary chamber. The piston rod sealingly slides in a secondary bore of smaller cross-sectional area than the primary bore. An expander piston sealingly slides in a bore and defines a primary expander chamber and a secondary expander chamber. In use, initial movement of the piston causes fluid to be displaced from the primary chamber to the brake circuit at a rate corresponding to the area of the primary bore. When the pressure in primary chamber becomes sufficiently large the expander piston is moved to the right against the bias of a spring to allow fluid to flow out of primary chamber into primary expander chamber via a passage. An equal volume of fluid is displaced from secondary expander chamber into secondary chamber via a passage. The effect is to reduce the effective cross-sectional area of the piston to that of the piston rod and thereby allow a higher pressure to be generated for a given input force.

9 Claims, 3 Drawing Figures

HYDRAULIC MASTER CYLINDERS

This invention relates to hydraulic master cylinders.

A hydraulic master cylinder has been proposed in which for a constant rate of displacement of the input rod the output of hydraulic fluid is initially at a relatively high volume rate and low pressure, and is subsequently at a relatively low volume rate and high pressure. Such a hydraulic master cylinder is particularly suitable for a braking system in which the friction linings must be moved a significant distance before they contact their associated friction surfaces. In this case, the high volume rate output of the master cylinder moves the friction linings rapidly into engagement with their associated friction surfaces for a relatively small amount of foot pedal travel. As soon as the friction linings are firmly in engagement with their associated friction surfaces the pressure in the braking system rises substantially and thereafter the master cylinder produces a low volume high pressure output to effect braking in the normal way.

A problem which has been encountered with master cylinders of the prior art having such output characteristics is that if the brakes are applied, then partially released, and then re-applied the characteristics of the master cylinder can be different upon re-application than on the initial application. This will result in the braking system having a different "feel" when the brakes are re-applied as compared with the first application. This is disconcerting to the driver of the vehicle, and can accordingly be dangerous.

According to one feature of the present invention there is provided a hydraulic master cylinder comprising: a body defining a primary bore and a secondary bore co-axial with and having a smaller cross-sectional area than the primary bore; a piston rod slidably and sealingly mounted in the secondary bore; a piston connected to the piston rod and slidingly and sealingly mounted in the primary bore, the piston dividing the primary bore into a primary chamber located on the side of the piston remote from the piston rod and a secondary annular chamber located between the piston rod and the wall of the primary bore; an outlet from the primary chamber for supplying fluid from the primary chamber to hydraulic apparatus; an expander chamber in fluid communication with both the primary chamber and the secondary chamber; and a movable expander member located within the expander chamber and dividing the expander chamber into a primary portion which is in fluid communication with the primary chamber and a secondary portion which is in fluid communication with the secondary chamber, the expander member being movable in response to a predetermined pressure differential between the primary and secondary chambers to expand the volume of the primary portion of the expander chamber to receive fluid from the primary chamber and to contract the volume of the secondary portion of the expander chamber and thereby supply fluid to the secondary chamber.

With a preferred embodiment of the invention the output characteristics of the master cylinder will be substantially the same upon re-application of the brakes after partial release as on initial application of the brakes.

A further problem which may arise with prior art master cylinders is that if the brakes are applied very rapidly, as for example in an emergency, the pressure within the master cylinder rises very rapidly because of the flow resistance of the pipes connecting the master cylinder to the various slave cylinders. This can mean that the pressure in the master cylinder can at certain times be substantially higher than the pressure in the slave cylinders. If the master cylinder is designed to change from a high volume output to a low volume output as a predetermined master cylinder pressure the situation can arise during emergency braking that the change to low volume output occurs before the friction lining materials are firmly engaged with their associated friction surfaces. The remaining fluid required to move the friction linings into engagement with the friction surfaces is supplied at the low volume rate, and this results in considerable pedal travel before the brakes become firmly applied. The net result can be that during emergency braking a considerably longer pedal travel is required in order to apply the brakes fully than that required during normal braking. This again can be most disconcerting.

In the preferred embodiment of the present invention means are provided for restricting the speed of response of the expander member to a rapid rise in pressure in the primary chamber. By suitable design, the speed of response of the expander member can be selected such that even during emergency braking the friction linings will be firmly engaged with their associated friction surfaces by the time that the master cylinder switches from high volume to low volume output.

The above and further features and advantages of the present invention will become clear from the following description of preferred embodiments thereof, given by way of example only, reference being had to the accompanying drawings, wherein.

Figure 1:
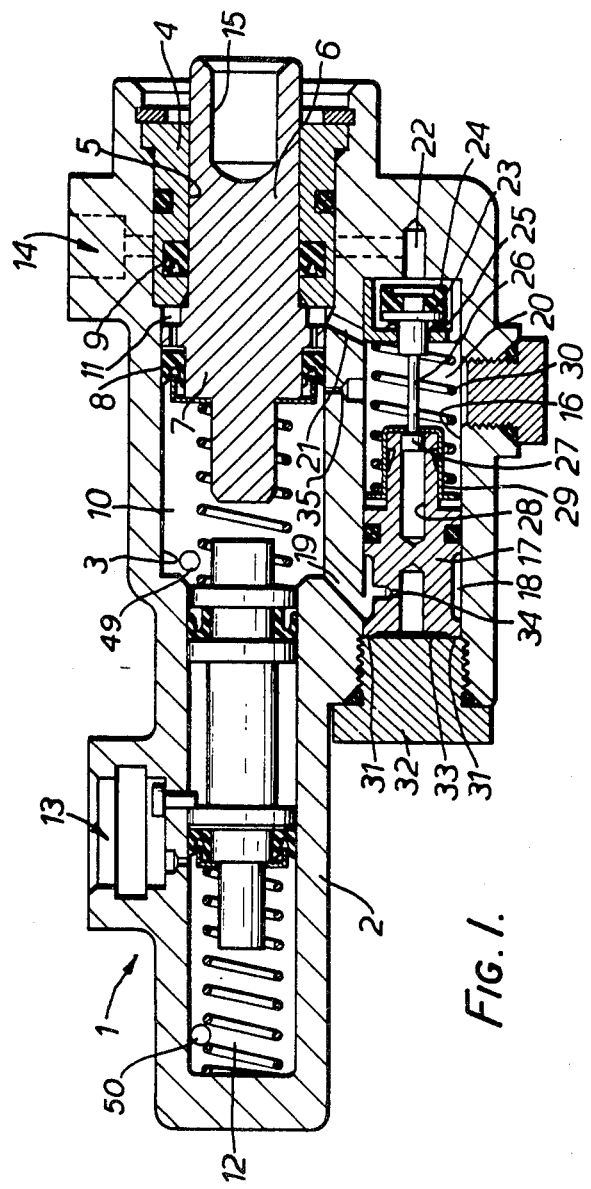
FIG. 1 shows a first embodiment of master cylinder according to the present invention.

Referring firstly to FIG. 1 the master cylinder 1 comprises a body 2 in which is machined a primary bore 3. A sleeve 4 is secured within the body 2 and defines a secondary bore 5. A piston rod 6 is slidably mounted in the secondary bore 5 and carries a piston 7 which is slidably mounted in the primary bore 3. A main seal 8 is provided between the piston 7 and the wall of the main bore 3, and a piston rod seal 9 is provided between the piston rod 6 and the sleeve 4.

The piston 7 divides the primary bore 3 into a primary chamber 10 and a secondary annular chamber 11. An outlet 49 is provided for supplying hydraulic fluid from the primary chamber 10 to a braking circuit. The master cylinder is of tandem design, and accordingly includes a further outlet chamber 12 having a further outlet 50 for supplying fluid to a separate part of the braking circuit. In use, a tandem reservoir of conventional design is mounted on top of the master cylinder 1 and is connected to supply hydraulic fluid to inlets 13 and 14. A socket 15 is provided in the end of the piston rod 6 in which is received an operating rod connected to a vehicle brake pedal. Alternatively, the output member of a servo (not shown) may be arranged in the socket 15.

An expander bore 16 is formed in the body 2 parallel to the primary bore 3. An expander piston 17 is slidably and sealingly mounted in the expander bore 16 and divides the expander bore into a primary expander chamber 18 which is connected to the primary chamber 10 by a passage 19, and a secondary expander chamber 20 which is connected to the annular chamber 11 by a passage 21. A passage 22 connects the righthand end of the expander bore 16 to the inlet 14.

A centre valve 23 controls communication between the passage 22 and the secondary expander chamber 20. The valve 23 includes a valve head 24 which is biased to isolate the passage 22 from the chamber 20 by a spring 25. A rod 26 is connected to the valve head 24 and terminates in a flange 27. The flange 27 is held captive within a bore 28 in the expander piston 17 by means of a cup 29. The cup 29 is biased to the left as viewed in FIG. 1 by a spring 30 which, as will be explained in more detail hereinafter, is sufficiently strong to overcome the spring 25 and hold the valve 23 open during various operating conditions of the master cylinder.

The left-hand end of the expander piston 17 (as viewed in FIG. 1) includes an annular rim 31 which, under the influence of spring 30 firmly engages a closure plug 32 which closes the end of the expander bore 16. The left-hand end face of the piston 17 is relieved radially inwardly of the rim 31 so that when the rim 31 is in engagement with the end plug 32 the relieved portion defines a chamber 33 having a smaller cross-sectional area than the expander bore. The chamber 33 is connected to the passage 19 by way of a restrictor orifice 34.

A small orifice 35 connects the secondary expander chamber 20 to the primary chamber 10 when the piston 7 is in the position shown in FIG. 1 in order to provide communication between the primary chamber 10 and the reservoir inlet 14 via the passage 22 and the secondary expander chamber 20.

In use, when the vehicle brake pedal is moved to apply the brakes the piston 7 and piston rod 6 are moved to the left as viewed in FIG. 1. As the piston moves the orifice 35 is isolated from the primary chamber 10 and fluid is forced out of the primary chamber 10 into the brake circuit by the advancing piston 7. Since the piston 7 is displacing fluid over the whole area of the primary bore 3 fluid flows to the braking circuit at a relatively high volume rate for a given rate of forward movement of the piston 7. This ensures that the friction linings of the brake system are advanced rapidly into contact with their associated friction surfaces for a relatively small movement of the piston 7. When the friction linings are in engagement with their associated friction surfaces further movement of the piston 7 begins to apply the brakes and the pressure within the primary chamber 10 rises. As the piston 7 advances fluid flows into the annular chamber 11 from the inlet 14 via the passage 22, open valve 23, secondary expander chamber 20, and passage 21. As long as the valve 23 is open the pressure within the annular chamber 11 and the secondary expander chamber 20 remain substantially atmospheric.

As the pressure within the primary chamber 10 increases a pressure differential is built up across the expander piston 17. When the pressure differential reaches a predetermined value, for example 4 bar, it is sufficient to overcome the effect of the spring 30 and the expander piston 17 starts to move to the right as viewed in FIG. 1. As the expander piston begins to move the valve head 24 is relieved of the load of spring 30 and the valve 23 closes under the influence of spring 25 isolating the chamber 20 from the passage 22. Continued movement of the piston 7 to the left increases the pressure within the primary chamber 10 and causes further movement of the expander piston 17 to the right. As the expander piston 17 moves to the right the volume of the primary expander chamber 18 increases and fluid flows into this chamber via the passage 19. Concomitantly the volume of the secondary expander chamber 20 is decreased and fluid flows from this chamber into the secondary chamber 11 via passage 21. The removal of fluid from the primary chamber 10 and the addition of an equal volume of fluid to the secondary chamber 11 in this manner means that, in effect, the seal 8 is by-passed and the displacement of fluid from the master cylinder to the brake circuit is caused by the cross section area of the piston rod 6 encompassed by the seal 9 as the rod advances into the primary bore 3 rather than by the cross-sectional area of the piston 7 encompassed by the seal 8. Although the spring 30 is effective to maintain a pressure differential between the primary chamber 10 and the secondary chamber 11, this pressure differential only increases slowly as the expander piston 17 moves to the right and in effect brake application is produced by the advance of the piston rod 6. Since the piston rod 6 has an area which is smaller than that of the piston 7 continued advance of the piston rod 6 at a constant rate produces a smaller rate of supply of fluid to the brake circuit than that which would be provided by the piston 7, but for a given increase in force applied to the piston rod 6 the output pressure of the master cylinder increases more rapidly than would be the case if fluid displacement was effected by the piston 7.

The operation of the above described master cylinder is accordingly such that when the brakes are initially applied the friction linings are moved rapidly into engagement with the friction surfaces by displacement of fluid by the large area piston 7. As pressure in the braking circuit increases fluid displacement is transferred to the piston rod 6 and a high pressure can be generated with much less force than would be required to generate a high pressure by means of the piston 7.

When the brakes are released the piston rod 6 and piston 7 move to the right and the expander piston 17 moves to the left. When the pressure in the primary chamber 10 drops to 4 bars the piston 17 seats against the end plug 32 and the valve 23 is opened by the spring 30 to re-connect the chamber 20 to the reservoir. At this point the piston 7 starts to operate in conventional manner and further retraction of the piston rod 6 allows fluid to flow into the chamber 10 from the brake circuit in order to complete the release of the brakes. It will be appreciated that at any stage during the release of the brakes the pressures within the various chambers are the same as at the corresponding stages during the application of the brakes. Accordingly, the "feel" of the braking system during release is exactly the reverse of the feel upon application. Further, if at any stage during release of the brakes it is decided to re-apply the brakes the feel of the braking system during re-application will be substantially identical to the feel during initial application.

If during an emergency the brakes are applied very rapidly the pressure in the chamber 10 could rise above 4 bars before the friction linings are all in engagement with their respective friction surfaces. In order to prevent rapid movement of the expander piston 17 under these circumstances and the corresponding increase in brake pedal travel, the restrictor orifice 34 is provided. This orifice restricts the rate at which fluid can flow into the chamber 33, and accordingly restricts the speed of response of the expander piston 17 to a rapid rise in pressure differential across the expander piston. Further, until initial movement of the expander piston 17 occurs the force tending to move the expander piston is produced by the pressure within the chamber 33. Since this chamber has an area which is somewhat smaller than the full bore of the expander bore, initial movement of the expander piston will be delayed. The orifice 34 in combination with the chamber 33 accordingly prevents undue pedal travel occurring in the event of emergency braking.

It will be appreciated that whilst the above described embodiment of the invention has been described in relation to a tandem master cylinder, the invention is equally applicable to a conventional single output master cylinder.

Figure 2:
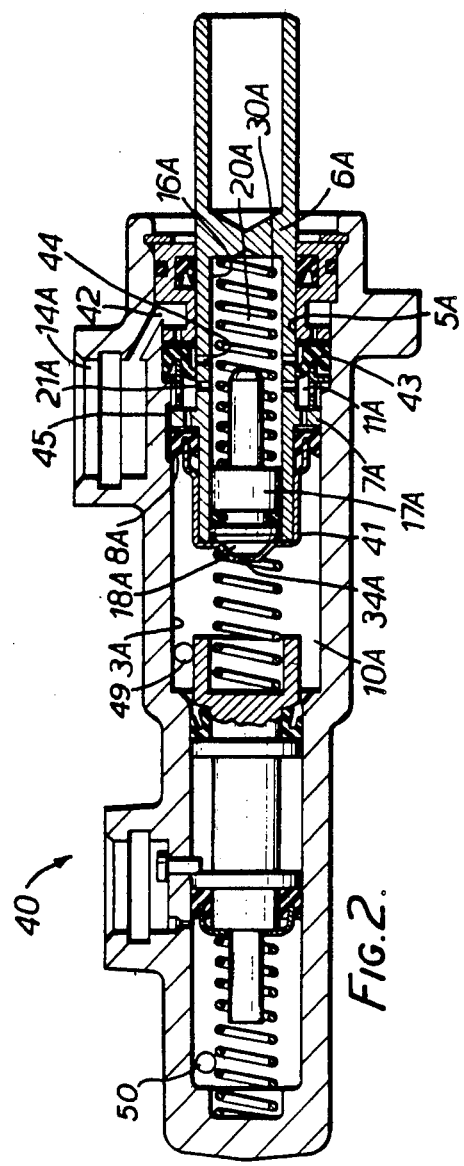
FIG. 2 shows a second embodiment of master cylinder according to the present invention.

FIG. 2 shows a further embodiment of tandem master cylinder according to the invention. The master cylinder 40 shown comprises a primary bore 3A and a secondary bore 5A corresponding to the primary and secondary bores 3,5 respectively of FIG. 1. A piston 7A is slidably and sealingly mounted in the primary bore 3A and a piston rod 6A connected to the piston 7A is slidingly and sealingly mounted in the bore 5A. The piston 7A divides the primary bore 3A into a primary chamber 10A and a secondary chamber 11A. An expander bore 16A is formed in the piston rod 6A and has an expander piston 17A which is slidably and sealingly mounted in the expander bore 16A and is biased to the left as viewed in FIG. 2 by a spring 30A. A cap 41 is secured to the piston rod 6A and substantially closes the left-hand end of the expander bore 16A whereby a primary expander chamber 18A is formed on one side of the piston 17A and a secondary expander chamber 20A is formed on the right of the piston 17A. The primary expander chamber 18A is connected to the primary chamber 10A by a small aperture 34A in the cap 41 whilst the secondary expander chamber 20A is connected to the secondary chamber 10A by means of radial ports 21A formed in the piston 6A.

In use, upon initial application of the brakes the piston 7A moves to the left and fluid is expelled from the primary chamber 10A into the braking circuit in the manner described above with reference to FIG. 1. As the volume of the secondary chamber 11A increases fluid is drawn into the secondary chamber 11A from the inlet 14A via a passage 42 and a seal 43 which yields to permit fluid flow between the inner periphery of the seal and the piston rod.

When the pressure differential between the primary expander chamber 18A and secondary expander chamber 20A has risen sufficiently high to overcome the spring 30A the expander piston 17A moves to the right and forces fluid into the secondary chamber 11A via the ports 21A. This increases the pressure within the secondary chamber 11A to a value above atmospheric and causes the seal 43 to seat on to the piston rod and prevent further fluid from being drawn into the secondary chamber 11A from the inlet 14A. Thereafter, further movement of the piston rod 6A to the left causes progressive movement of the expander piston 17A to the right and pressure within the primary chamber 10A is effectively increased by the advancing piston rod 6A rather than the piston 7A as described above with reference to FIG. 1. When the brakes are subsequently released the expander piston 17A travels progressively to the left as the piston rod 6A travels to the right until it again seats on cap 41. Thereafter fluid from the secondary chamber 11A flows past the main piston seal 8A into the primary chamber 10A until a relief port 44 passes the seal 43 and allows fluid from the secondary expander chamber 20A to flow back through passage 42 to the reservoir. When the piston rod 6A has returned to its initial position as shown in FIG. 2 the brake return springs continue to withdraw the friction linings from the associated friction surfaces and the surplus fluid which has flowed from the secondary chamber 11A to the primary chamber 10A past the seal 8A is returned to the reservoir via a groove 45 machined in the primary bore, the secondary chamber 11A, ports 21, secondary expander chamber 20A, port 44, and passage 42.

If the master cylinder 40 of FIG. 2 is subject to emergency braking so that the pressure within the primary chamber 10A rises to a high level rapidly past the expander piston 17A will not move rapidly to the right because of the small size of the orifice 34A connecting the primary chamber 10A to the primary expander chamber 18A. Further, the cap 41 extends radially inwardly to provide a seating for a rim on the end face of the piston 17A and accordingly the effective area over which pressure is applied to the piston 17A to effect initial movement of the piston 17A is less than the total cross-sectional area of the expander bore 16A.

As in the case of the embodiment of FIG. 1, although the master cylinder illustrated in FIG. 2 is a tandem design the features of the invention illustrated in FIG. 2 are equally applicable to a master cylinder having a single output.

In the case of the embodiments of FIGS. 1 and 2 the pressure within the primary chamber 10,10A will be higher than the pressure within the secondary chamber 11,11A when the master cylinder is working at a pressure higher than that at which the expander piston 17,17A is moved. Typically, if the springs 30,30A are designed to allow the expander piston 17,17A to commence moving when the pressure differential between the primary and secondary chambers is approximately 4 bar, the pressure differential between the two chambers will slowly increase as the pressure in the primary chamber increases until when the brakes are fully applied when the pressure in the primary chamber is for example 666 bar and the pressure differential between the chambers will be between 4 bar and 6 bar. Whilst such a small pressure differential is acceptable for most applications, it does have the effect that a higher force must be applied to the piston rod 6,6A to produce a given output pressure in the primary chamber 10,10A than would be necessary if the pressures within the primary and secondary chambers were equal.

Figure 3:
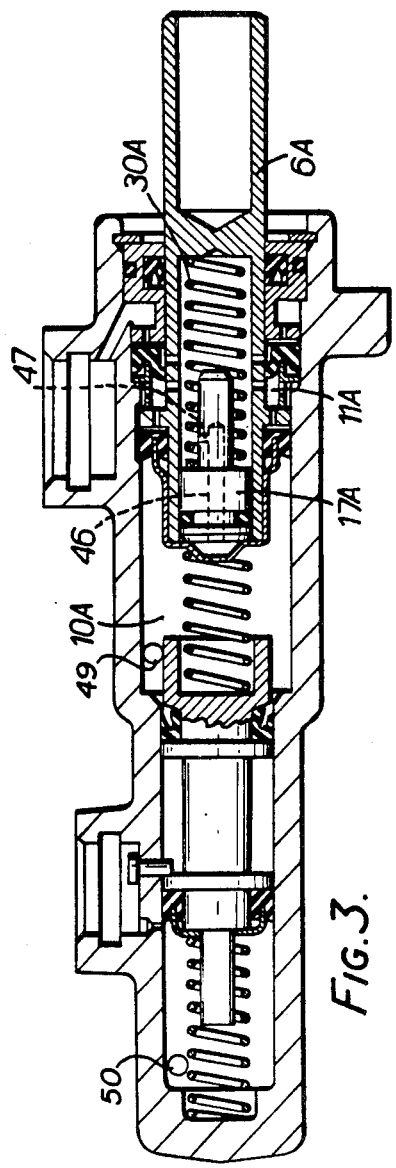
FIG. 3 shows a modification of the embodiment of FIG. 2.

Referring now to FIG. 3 this problem can be overcome by the provisions of a passage interconnecting the primary chamber 10A and the secondary chamber 11A. Such a passage may conveniently be provided by way of a bore 46 and orifice 47 formed in the expander piston 17A. The orifice 47 has a very small cross-section, and accordingly an insignificant small amount of fluid will flow through the orifice during initial brake application, and accordingly the friction linings will be brought rapidly into engagement with the associated friction surfaces without any significant loss of fluid from the primary chamber 10A to the secondary chamber 11A. However, when travel of the piston rod 6A slows or ceases the passage 46 and orifice 47 allow pressure to become equalised between the primary chamber 10A and secondary chamber 11A. At the same time, the expander piston 17A is returned to the end position shown in FIG. 3 by the spring 30A. The effect of the pressure equalisation is to reduce the pedal effort necessary to sustain a particular output pressure in the primary chamber 10A. When the brakes are released, with the piston 17A in its original position, the fluid from the chamber 11A flows past the outer peripheral edge of seal 8A, to provide fluid recuperation in chamber 10A.

I claim:

1. A hydraulic master cylinder comprising: a reservoir for hydraulic fluid; a body defining a primary bore and a secondary bore co-axial with and having a smaller cross-sectional area than the primary bore; a piston rod slidably and sealingly mounted in the secondary bore; a piston connected to the piston rod and slidingly and sealingly mounted in the primary bore, the piston dividing the primary bore into a primary chamber located on the side of the piston remote from the piston rod and a secondary annular chamber located between the piston rod and the wall of the primary bore; an outlet for supplying fluid from the primary chamber to hydraulic apparatus; an expander chamber in fluid communication with both the primary chamber and the secondary chamber; a movable expander member located within the expander chamber and dividing the expander chamber into a primary portion which is in fluid communication with the primary chamber and a secondary portion which is in permanent fluid communication with the secondary chamber, the expander member being movable in response to a predetermined pressure differential between the primary and secondary chambers to expand the volume of the primary portion of the expander chamber to receive fluid from the primary chamber and to contract the volume of the secondary portion of the expander chamber and thereby supply fluid to the secondary chamber; means permitting fluid to flow from the reservoir into the secondary chamber until said predetermined pressure differential is reached; and means thereafter preventing fluid flow between the reservoir and the secondary chamber whereby, during brake application, after said predetermined pressure differential is attained said secondary chamber is pressurized and the effective cross-sectional area of said master cylinder is the cross-sectional area of the secondary bore.

2. A hydraulic master cylinder according to claim 1 wherein the expander chamber is a bore and the expander member comprises an expander piston slidingly and sealingly mounted in the expander chamber bore; and wherein resilient means is provided biasing the expander piston against said movement to expand the volume of the primary portion of the expander chamber.

3. A hydraulic master cylinder according to claim 1 including means restricting the speed of response of the expander member to a rapid rise in pressure in the primary chamber.

4. A hydraulic master cylinder according to claim 3 wherein the means restricting the speed of response of the expander member comprises a restrictor orifice for restricting flow of fluid from the primary chamber to the primary portion of the expander chamber at least during initial movement of the expander member.

5. A hydraulic master cylinder according to claim 2 including means reducing the effective cross-sectional area of the expander piston which is exposed to the primary portion of the expander chamber to a value less than the full cross-sectional area of the expander chamber bore prior to movement of the expander piston.

6. A hydraulic master cylinder according to any preceding claim including valve means effective to provide fluid communication between the secondary chamber and a hydraulic fluid reservoir during that part of a pressure generating stroke of the piston which occurs before movement of the expander member, and effective during the remainder of a pressure generating stroke to prevent said communication.

7. A hydraulic master cylinder according to claim 6 including a passage interconnecting the primary and secondary chambers to provide equalisation of pressure in the primary and secondary chambers when the piston is substantially stationary relative to the primary bore.

8. A hydraulic master cylinder according to claim 7 wherein the expander chamber comprises a bore formed in the body.

9. A hydraulic master cylinder according to any of claims 1 to 5 wherein the expander chamber comprises a bore formed in the piston rod.

* * * * *